(12) United States Patent  
Yang

(10) Patent No.: US 6,750,986 B1
(45) Date of Patent: *Jun. 15, 2004

(54) COLOR IMAGE PROCESSING METHOD WITH THIN-LINE DETECTION AND ENHANCEMENT

(75) Inventor: Keven Yang, Taipei Hsien (TW)

(73) Assignee: Destiny Technology Corporation, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/536,510

(22) Filed: Mar. 27, 2000

(51) Int. Cl.$^7$ ................................................. H04N 1/40
(52) U.S. Cl. .................... 358/462; 358/464; 382/165
(58) Field of Search .................. 358/462, 463, 358/456, 464, 461, 465, 520, 505; 382/164, 165, 176, 162, 167

(56) References Cited

U.S. PATENT DOCUMENTS

| | | | |
|---|---|---|---|
| 4,053,737 A | 10/1977 | Lafevers et al. ............... 235/449 |
| 4,733,252 A | 3/1988 | Daniele et al. ............... 346/108 |
| 4,823,151 A | 4/1989 | Miura ........................ 346/160 |
| 4,989,019 A | 1/1991 | Loce et al. .................. 346/108 |
| 4,996,603 A * | 2/1991 | Kanemitsu et al. ........... 358/462 |
| 5,014,124 A | 5/1991 | Fujisawa |
| 5,029,108 A | 7/1991 | Lung |
| 5,274,428 A | 12/1993 | Wong et al. ................ 355/326 |
| 5,335,292 A | 8/1994 | Lovelady et al. ........... 382/163 |
| 5,387,983 A | 2/1995 | Sugiura et al. |
| 5,390,262 A | 2/1995 | Pope .......................... 382/234 |
| 5,396,584 A | 3/1995 | Lee et al. |
| 5,422,736 A | 6/1995 | Katayama .................... 358/462 |
| 5,432,535 A | 7/1995 | Andrews et al. ............. 347/242 |
| 5,438,651 A * | 8/1995 | Suzuki et al. ............... 345/592 |
| 5,459,587 A | 10/1995 | Fukushima |
| 5,473,444 A * | 12/1995 | Sakano et al. ............... 358/461 |
| 5,548,415 A | 8/1996 | Tanaka et al. |
| 5,619,334 A | 4/1997 | Adams et al. ............... 358/298 |
| 5,619,592 A | 4/1997 | Bloomberg et al. ......... 382/175 |
| 5,696,842 A | 12/1997 | Shirasawa et al. .......... 382/176 |
| 5,745,153 A | 4/1998 | Kessler et al. ............... 347/241 |
| 5,764,377 A | 6/1998 | Nacman et al. ............. 358/444 |
| 5,781,659 A | 7/1998 | Melen et al. ............... 382/187 |
| 5,859,928 A | 1/1999 | Noh ........................... 382/172 |
| 5,872,573 A | 2/1999 | Adegeest |
| 5,892,852 A * | 4/1999 | Namizuka et al. .......... 382/254 |
| 5,911,004 A | 6/1999 | Ohuchi et al. ............... 382/173 |
| 5,956,156 A | 9/1999 | Fukushima |
| 5,956,468 A * | 9/1999 | Ancin ........................ 358/1.9 |

(List continued on next page.)

FOREIGN PATENT DOCUMENTS

| | | |
|---|---|---|
| JP | 61157161 | 7/1986 |
| JP | 62100884 | 11/1987 |
| JP | 02084879 | 3/1990 |
| JP | 04362870 | 12/1992 |
| JP | 05006438 | 1/1993 |
| JP | 05091312 | 4/1993 |
| JP | 08051538 | 2/1996 |
| JP | 11305752 | 11/1999 |
| JP | 11355576 | 12/1999 |
| JP | 200011188 | 1/2000 |
| JP | 2001-309179 | * 2/2001 |
| JP | 2001 309092 | 11/2001 |

Primary Examiner—Kimberly Williams
Assistant Examiner—Michael Burleson
(74) Attorney, Agent, or Firm—Alan D. Kamrath; Nikolai & Mersereau, P.A.

(57) ABSTRACT

A color image processing provides a thin-line enhancement module for a color image for finding and keeping thin lines in the color image. A boundary enhancement module is provided for finding and keeping the boundary in the color image. A de-background module is provided for removing noise pixels from white background. The color image is processed to avoid missing and/or twisting the thin lines, boundary, background, and texts in the color image after the scanning procedure.

23 Claims, 2 Drawing Sheets

U.S. PATENT DOCUMENTS

| | | | |
|---|---|---|---|
| 6,014,462 A | 1/2000 | Yamakawa | 382/200 |
| 6,026,184 A | 2/2000 | Fukushima | |
| 6,038,340 A | 3/2000 | Ancin et al. | 382/167 |
| 6,167,163 A | 12/2000 | Fukushima | |
| 6,167,166 A * | 12/2000 | Loce et al. | 382/266 |
| 6,227,725 B1 | 5/2001 | Ancin et al. | 358/1.9 |
| 6,272,240 B1 | 8/2001 | Li et al. | 382/173 |
| 6,360,009 B2 | 3/2002 | Li et al. | 382/176 |
| 6,480,196 B1 * | 11/2002 | Harrington | 345/443 |
| 6,519,362 B1 | 2/2003 | Cusmariu | 382/176 |
| 6,529,643 B1 | 3/2003 | Loce et al. | 382/300 |
| 6,556,311 B1 | 4/2003 | Benear et al. | 358/1.9 |
| 2002/0031263 A1 * | 3/2002 | Yamakawa | 382/199 |

* cited by examiner

COLOR IMAGE PROCESSING METHOD WITH THIN-LINE DETECTION AND ENHANCEMENT

BACKGROUND OF THE INVENTION

1. Field of the Invention

The present invention relates to a color image processing method with thin-line detection and enhancement.

2. Description of the Related Art

Nowadays, computers are widely used to process color images generated as a result of scanning pictures by scanners. A normal procedure includes scanning a picture by a scanner and then using image-editing software(s) to edit the color image generated as a result of scanning. Nevertheless, it is often found that the color image is not clear and in disagreement with the picture in a certain degree, particularly in thin lines, boundary, background, and texts. More specifically, thin lines, boundary, background, and texts in the picture are often missing or twisted in the color image after the scanning procedure. This provides a poor ground for the subsequent color image editing.

The present invention is intended to provide a color image processing method that mitigates and/or obviates the above problems.

SUMMARY OF THE INVENTION

It is the primary object of the present invention to provide a color image processing that provides a thin-line enhancement module for a color image, thereby finding and keeping thin lines in the color image.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
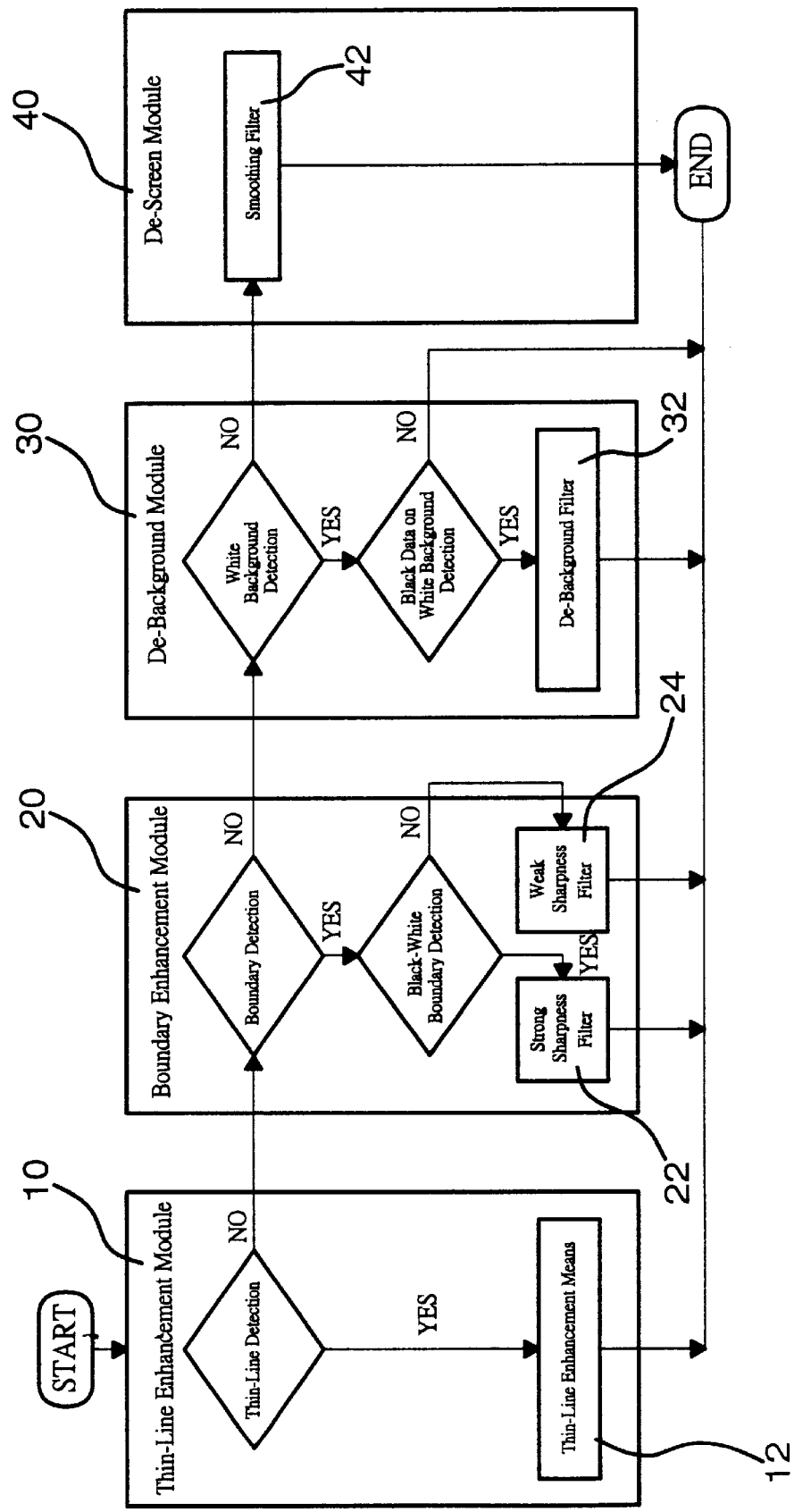
FIG. 1 is a flow chart illustrating a method in accordance with the present invention for processing a color image as a result of scanning a picture.

Referring to FIG. 1, a method in accordance with the present invention is provided for enhancing a color image generated as a result of scanning a picture. Namely, a picture is scanned by a scanner connected to a computer to generate a color image. A first step of the method in accordance with the present invention includes detecting thin lines in the color image by a thin-line enhancement module 10. In this step, a 3×5 (or 5×3) pixel window (or array) and a 5×5 pixel window are created for each pixel in the color image. The 3×5 (or 5×3) pixel window and the 5×5 pixel window are based and centered on a selected pixel in the color image.

Definition

Figure 2:
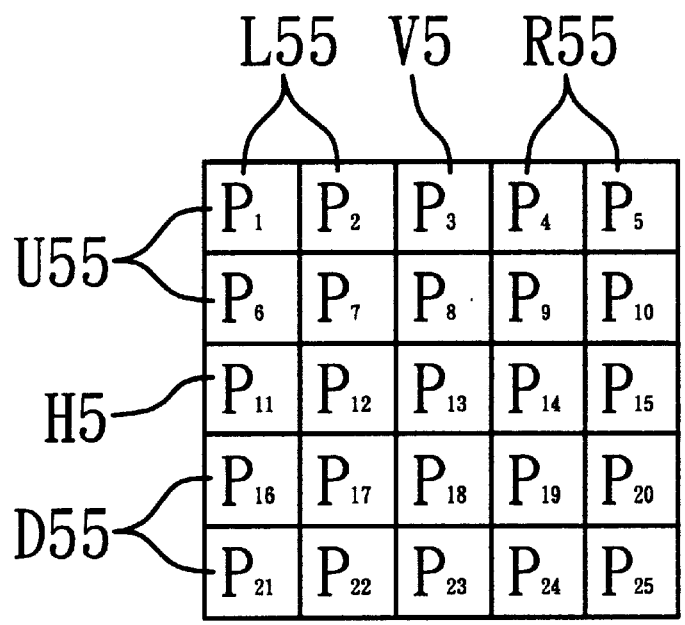
FIG. 2 is a 5×5 pixel window generated for discriminating purposes.

For a 5×5 pixel window shown in FIG. 2, the sum of color values of the left two columns (P1, P6, P11, P16, P21, P2, P7, P12, P17, P22) is defined as L55, the sum of color values of the middle column (P3, P8, P13, P18, P23) is defined as V5, and V55=2*V5, and the sum of color values of the right two columns (P4, P9, P14, P19, P24, P5, P10, P15, P20, P25) is defined as R55. It is noted that the selected pixel on which the 5×5 pixel window is based is located in the center of the middle column. The sum of color values of the upper two rows (P1~P10) is defined as U55, the sum of color values of the middle row (P11~P15) is defined as H5, and H55=2*H5, and the sum of color values of the lower two rows (P16~P25) is defined as D55. The term "color value" referred to herein means the hue value for each pixel.

Figure 3:
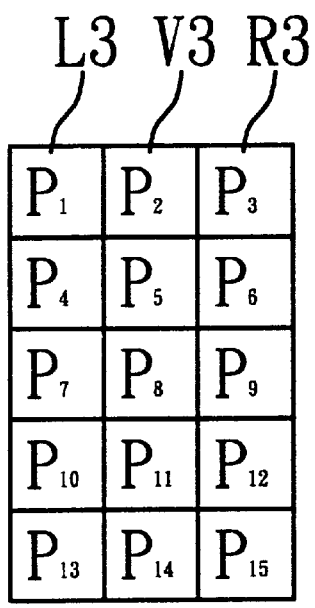
FIG. 3 is a 3×5 pixel window generated for discriminating purposes.
Figure 4:
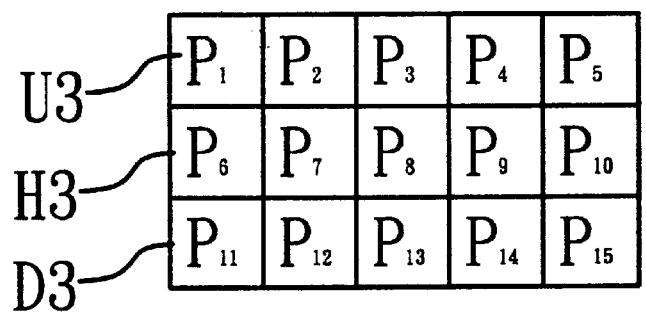
FIG. 4 is a 3×3 pixel window generated for discriminating purposes.

For a 3×5 pixel window shown in FIG. 3, the sum of color values of the left column (P1, P4, P7, P10, P13) is defined as L3, and L35=2*L3, the sum of color values of the middle column (P2, P5, P8, P11, P14) is defined as V3, and V35=2*V3, and the sum of color values of the right column (P3, P6, P9, P12, P15) is defined as R3, and R35=2*R3. It is noted that the selected pixel on which the 3×5 pixel window is based is located in the center of the middle column. For a 5×3 pixel window shown in FIG. 4, the sum of color values of the upper row (P1~P5) is defined as U3, and U53=2*U3, the sum of color values of the middle row (P6~P10) is defined as H3, and H53=2*H3, and the sum of color values of the lower row (P11~P15) is defined as D3, and D53=2*D3.

For a 5×5 pixel window, the sum of color values of three pixels P3, P7, P11 (FIG. 2) is defined as LU45_3; the sum of color values of three pixels P9, P13, P17 is defined as LV45_3; and the sum of color values of three pixels P15, P19, P23 is defined as LD45_3. In addition, the sum of color values of three pixels P3, P9, P15 is defined as RV45_3; the sum of color values of three pixels P7, P13, P19 is defined as RU45_3; and the sum of color values of three pixels P11, P17, P23 is defined as RD45_3.

A thin line is defined as a line with a one (1)-pixel width.

Since the red, green, and blue channels are digitized and thus all fall in the range of 0~255, two thresholds, e.g., 30 (T45) and 225 (T46) are selected for determining the values for txcount and bgcount (both of which will be described later). For the twenty-five points in the 5×5 pixel window, distribution of each of the 25 points is considered. The txcount is added by one (1) if all of the hue values of the red, green, and blue channels fall in a range of 0~30. The txcount is reset to be zero when considering another pixel in the color image based on which another pixel window is created. The bgcount is added by one (1) if all of the hue values of the red, green, and blue channels fall in a range of 225~255. The bgcount is reset to be zero when considering another pixel in the color image based on which another pixel window is created.

Thin-Line Detection

Since there are three primary colors (red, green and blue, the so-called three channels), separate considerations are required. Namely, the hue value for each primary color for each pixel must be considered. For the red channel of each pixel, the maximum hue value is 255 for red and 0 for black. Equation (1) is given below to determine whether a thin-line exists when taking the red channel into considerations.

$$(L55r - V55r) \geq T1 \text{ and } (R55r - V55r) \geq T2 \qquad (1)$$

wherein T1 and T2 are predetermined thresholds.

Similarly, Equation (2) is given below to determine whether a thin-line exists when taking the green channel into consideration.

$$(L55g - V55g) \geq T3 \text{ and } (R55g - V55g) \geq T4 \qquad (2)$$

wherein T3 and T4 are predetermined thresholds.

Similarly, Equation (3) is given below to determine whether a thin-line exists when taking the blue channel into consideration.

$$(L55b-V55b) \geq T5 \text{ and } (R55b-V55b) \geq T6 \quad (3)$$

wherein T5 and T6 are predetermined thresholds.

It is discriminated that a vertical thin line exists if any one of Equations (1), (2), and (3) is fulfilled.

Similarly, it is discriminated that a horizontal line exists if any one of the following Equations (4), (5), and (6) is fulfilled.

$$(U55r-H55r) \geq T7 \text{ and } (D55r-H55r) \geq T8 \quad (4)$$

wherein T7 and T8 are predetermined thresholds for the red channel.

$$(U55g-H55g) \geq T9 \text{ and } (D55g-H55g) \geq T10 \quad (5)$$

wherein T9 and T10 are predetermined thresholds for the green channel.

$$(U55b-H55b) \geq T11 \text{ and } (D55b-H55b) \geq T12 \quad (6)$$

wherein T11 and T12 are predetermined thresholds for the blue channel.

It is appreciated that T1~T12 are preferably of the same value, e.g., 512.

The following Equations (7), (8) (9) are used to discriminate existence of a thin-line of a slope of 1.

$$(LU45\_3r-LV45\_3r) \geq T13 \text{ and } (LD45\_3r-LV45\_3r) \geq T14 \quad (7)$$

wherein T13 and T14 are predetermined thresholds for the red channel.

$$(LU45\_3g-LV45\_3g) \geq T15 \text{ and } (LD45\_3g-LV45\_3g) \geq T16 \quad (8)$$

wherein T15 and T16 are predetermined thresholds for the green channel.

$$(LU45\_3b-LV45\_3b) \geq T17 \text{ and } (LD45\_3b-LV45\_3b) \geq T18 \quad (9)$$

wherein T17 and T18 are predetermined thresholds for the blue channel.

It is discriminated that a thin line having a slope of 1 exists if any one of Equations (7), (8), and (9) is fulfilled.

The following Equations (10), (11) (12) are used to discriminate existence of a thin-line of a slope of −1.

$$(RU45\_3r-RV45\_3r) \geq T19 \text{ and } (RD45\_3r-RV45\_3r) \geq T20 \quad (10)$$

wherein T19 and T20 are predetermined thresholds for the red channel.

$$(RU45\_3g-RV45\_3g) \geq T21 \text{ and } (RD45\_3g-RV45\_3g) \geq T22 \quad (11)$$

wherein T21 and T22 are predetermined thresholds for the green channel.

$$(RU45\_3b-RV453b) \geq T23 \text{ and } (RD45\_3b-RV45\_3b) \geq T24 \quad (12)$$

wherein T23 and T24 are predetermined thresholds for the blue channel.

It is discriminated that a thin line having a slope of −1 exists if any one of Equations (10), (11), and (12) is fulfilled.

It is appreciated that T13~T24 are preferably of the same value.

If a thin line is detected, then a thin-line enhancing procedure is applied to the data inspected to thereby make the thin line vivid; if not, the data is then passed to a boundary enhancement module. The thin-line enhancing procedure is accomplished by a thin-line enhancement means 12. If no thin line is detected, the data is passed to a boundary enhancement module 20.

Black and White Boundary Detection

A boundary is defined as a transition between two blocks of different colors that has no thin-line. The following Equations (13), (14), and (15) are used to detect whether a vertical boundary exists.

$$|(L55r-R55r)| \geq T25 \text{ and } |(L35r-R35r)| \geq T26 \quad (13)$$

wherein T25 and T26 are predetermined thresholds for the red channel.

$$|(L55g-R55g)| \geq T27 \text{ and } |(L35g-R35g)| \geq T28 \quad (14)$$

wherein T27 and T28 are predetermined thresholds for the green channel.

$$|(L55b-R55b)| \geq T29 \text{ and } |(L35b-R35b)| \geq T30 \quad (15)$$

wherein T29 and T30 are predetermined thresholds for the blue channel.

It is discriminated that a vertical boundary exists if any one of Equations (13), (14), and (15) is fulfilled.

Similarly, Equations (16), (17), (18) are used to detect whether a horizontal boundary exists.

$$|(U55r-D55r)| \geq T31 \text{ and } |(U53r-D53r)| \geq T32 \quad (16)$$

wherein T31 and T32 are predetermined values for the red channel.

$$|(U55g-D55g)| \geq T33 \text{ and } |(U53g-D53g)| \geq T34 \quad (17)$$

wherein T33 and T34 are predetermined values for the green channel.

$$|(U55b-D55b)| \geq T35 \text{ and } |(U53b-D53b)| \geq T36 \quad (18)$$

wherein T35 and T36 are predetermined values for the blue channel.

If any one of Equations (16), (17), and (18) is fulfilled, it is discriminated as existence of a horizontal boundary.

Preferably, T25~T36 are of the same value, e.g., 192.

In Equations (13)~(15), both 5×5 and 3×5 pixel windows are used to discriminate existence of a vertical boundary. It is noted that it is possible to discriminate existence of a vertical boundary by only one pixel window (5×5 or 3×5), i.e., Equation (13) becomes $$|(L55r-R55r)| \geq T25 \quad (13a)$$

or $$|(L35r-R35r)| \geq T25 \quad (13b)$$

Equations (14) and (15) may be modified similarly. Nevertheless, it is found that misdiscrimination of the vertical boundary can be avoided by means of using Equations (13)~(15). The same situations exist in Equations (16)~(18), which will not be described in detail to avoid redundancy.

If a boundary is detected, then the boundary enhancement module 20 checks if it is a black-white boundary (i.e., one side is black and the other side is white). If a black-white boundary is detected, then a strong sharpness filter 22 is applied; otherwise, a weak sharpness filter 24 is used. The strong sharpness filter 22 causes the output to be sharper than that by the weak sharpness filter 24. If no boundary is detected, the data are then passed to a de-background module 30. Discrimination standards for the black-white boundary for a 5×5 pixel window are as follows:

If any one of Equations (13)(15) is fulfilled, the weak sharpness filter 24 is activated. If all of Equations (13)~(15) are fulfilled, the strong sharpness filter 22 is activated if the following Equation (19) is fulfilled (i.e., a black-white vertical boundary is detected):

$$bgcount \geq T37 \text{ and } txcount \geq T38 \tag{19}$$

wherein T37 (e.g., 0) and T38 (e.g., 15) are predetermined values and wherein $0 \geq txcount \geq 25$, $0 \geq bgcount \geq 25$, and $0 \geq (txcount+bgcount) \geq 25$.

If the bgcount is greater than T37 and the txcount is greater than T38, the strong sharpness filter 22 is activated. T37 and T38 are both adjustable.

Similarly, if any one of Equations (16)~(18) is fulfilled, the weak sharpness filter 24 is activated. If all of Equations (16)~(18) and Equation (19) are fulfilled (i.e., a black-white horizontal boundary is detected), the strong sharpness filter 22 is activated.

White or Black Background Detection

The de-background module 30 deals with black texts on white backgrounds for removing noise pixels from a white background. If a white background is detected, it is checked whether there are black data on the white background. If yes, a de-background filter 32 is applied for removing the noise pixel from the white background; otherwise, nothing is done. If the background is not white, the data are then passed to a de-screen module 40.

Equations (20) and (21) are used to determine whether to activate the de-background filter 32:

$$bgcount \geq T39 \text{ and } txcount < T40 \tag{20}$$

$$bgcount \geq T41 \text{ and } txcount < T42 \tag{21}$$

In an embodiment of the invention, T39=10; T40=15; T41=8; and T42=8.

The de-background filter is activated if either one of Equations (20) and (21) is fulfilled while all of the hue values of the red, green, and blue channels of the center point for the 5×5 pixel window are greater than a predetermined threshold T43 or smaller than a predetermined threshold T44. T43 and T44 are both adjustable.

De-Screen Module

The de-screen module 40 deals with non-black-and-white data. It removes artificial white lines on the color picture caused by screening. A smoothing filter 42 is applied to the data for smoothing the data.

Conclusion

According to the above description, it is appreciated that the thin-lines, boundary, background, and texts in the color image may be well processed to be as true as the color picture. Although a certain sequence is mentioned in the embodiment, it is appreciated that the steps of the method in accordance with the present invention can be arranged in a different sequence. Namely, the method for enhancing color images in accordance with the present invention includes any optional combinations of the above-mentioned steps. In addition, the Equations (1)~(21) may be optionally modified according to needs.

Although the invention has been explained in relation to its preferred embodiment, it is to be understood that many other possible modifications and variations can be made without departing from the spirit and scope of the invention as hereinafter claimed.

What is claimed is:

1. A method for processing a color image that is generated as a result of scanning a picture, the method comprising detecting whether thin lines exist in the color image, wherein detecting thin lines includes creating a 5×5 pixel window and a 3×5 pixel window that are based on and centered on a selected pixel in the color image, wherein for the 5×5 pixel window, the sum of hue values of a left two columns is defined as L55, the sum of hue values of a middle column is defined as V5, and V55=2*V5, and the sum of hue values of a right two columns is defined as R55; and wherein for a 3×5 pixel window, the sum of hue values of a left column is defined as L3, and L35=2*L3, the sum of hue values of a middle column is defined as V3, and V35=2*V3, and the sum of hue values of a right column is defined as R3, and R35=2*R3; and wherein it is discriminated that a vertical line exists if any one of the following Equations (1), (2), and (3) is fulfilled:

$$(L55r-V55r) \geq T1 \text{ and } (R55r-V55r) \geq T2 \tag{1}$$

wherein T1 and T2 are predetermined thresholds for a red channel;

$$(L55g-V55g) \geq T3 \text{ and } (R55g-V55g) \geq T4 \tag{2}$$

wherein T3 and T4 are predetermined thresholds for a green channel; and $$(L55b-V55b) \geq T5 \text{ and } (R55b-V55b) \geq T6 \tag{3}$$

wherein T5 and T6 are predetermined thresholds for a blue channel.

2. A method for processing a color image that is generated as a result of scanning a picture, the method comprising detecting whether thin lines exist in the color image, wherein detecting thin lines includes creating a 5×5 pixel window and a 5×3 pixel window that are based on and centered on a selected pixel in the color image, wherein for the 5×5 pixel window, the sum of hue values of an upper two rows is defined as U55, the sum of hue values of a middle row is defined as H5, and H55=2*H5, and the sum of hue values of a lower two rows is defined as D55, and wherein for the 5×3 pixel window, the sum of hue values of an upper row is defined as U3, and U53=2*U3, the sum of hue values of a middle row is defined as H3, and H53=2*H3, and the sum of hue values of a lower row is defined as D3, and D53=2*D3; and wherein it is discriminated that a horizontal line exists if any one of the following Equations (4), (5), and (6) is fulfilled:

$$(U55r-H55r) \geq T7 \text{ and } (D55r-H55r) \geq T8 \tag{4}$$

wherein T7 and T8 are predetermined thresholds for a red channel.

$$(U55g-H55g) \geq T9 \text{ and } (D55g-H5g) \geq T10 \tag{5}$$

wherein T9 and T10 are predetermined thresholds for a green channel.

$$(U55b-H55b) \geq T11 \text{ and } (D55b-H55b) \geq T12 \tag{6}$$

wherein T11 and T12 are predetermined thresholds for a blue channel.

3. A method for processing a color image that is generated as a result of scanning a picture, the method comprising detecting whether thin lines exist in the color image, wherein detecting thin lines includes creating a 5×5 pixel window that is based on and centered on a selected pixel in the color image, wherein for the 5×5 pixel window, the sum of hue values of a third pixel (P3) of a first row, a second point (P7) of a second row, and a first pixel (P11) of a third row is defined as LU45_3; the sum of hue values of a fourth pixel (P9) of the second row, a third pixel (P13) of the third row, and a second pixel (P17) of a fourth row is defined as LV45_3; and the sum of hue values of a fifth pixel (P15) of the third row, a fourth pixel (P19) of the fourth row, and a third pixel (P23) of a fifth row is defined as LD45_3; and wherein it is discriminated that a thin-line of a slope of 1 exists if any one of the following Equations (7), (8), and (9) is fulfilled:

$$(LU45\_3r - LV45\_3r) \geq T13 \text{ and } (LD45\_3r - LV45\_3r) \geq T14 \quad (7)$$

wherein T13 and T14 are predetermined thresholds for a red channel;

$$(LU45\_3g - LV45\_3g) \geq T15 \text{ and } (LD45\_3g - LV45\_3g) \geq T16 \quad (8)$$

wherein T15 and T16 are predetermined thresholds for a green channel;

$$(LU45\_3b - LV45\_3b) \geq T17 \text{ and } (LD45\_3b - LV45\_3b) \geq T18 \quad (9)$$

wherein T17 and T18 are predetermined thresholds for a blue channel.

4. A method for processing a color image that is generated as a result of scanning a picture, the method comprising detecting whether thin lines exist in the color image, wherein detecting thin lines includes creating a 5×5 pixel window that is based on and centered on a selected pixel in the color image, wherein for the 5×5 pixel window, the sum of hue values of a third pixel (P3) of a first row, a fourth pixel (P9) of a second row, and a fifth pixel (P15) of a third row is defined as RV45_3; the sum of hue values of a second pixel (P7) of the second row, a third pixel (P13) of the third row, and a fourth pixel (P19) of a fourth row is defined as RV45_3; and the sum of color values of a first pixel (P11) of the third row, a second pixel (P17) of the fourth row, and a third pixel (P23) of a fifth row is defined as RD45_3; and wherein it is discriminated that a thin-line of a slope of −1 exists if any one of the following Equations (10), (11), and (12) is fulfilled:

$$(RU45\_3r - RV45\_3r) \geq T19 \text{ and } (RD45\_3r - RV45\_3r) \geq T20 \quad (10)$$

wherein T19 and T20 are predetermined thresholds for red channel;

$$(RU45\_3g - RV45\_3g) \geq T21 \text{ and } (RD45\_3g - RV45\_3g) \geq T22 \quad (11)$$

wherein T21 and T22 are predetermined thresholds for green channel;

$$(RU45\_3b - RV45\_3b) \geq T23 \text{ and } (RD45\_3b - RV45\_3b) \geq T24 \quad (12)$$

wherein T23 and T24 are predetermined thresholds for blue channel.

5. A method for processing a color image that is generated as a result of scanning a picture, the method comprising detecting whether thin lines exist in the color image; and detecting whether a boundary exists in the color image if no thin line exists in the color image.

6. The method as claimed in claim 5, wherein detecting boundary includes creating a 5×5 pixel window and a 3×5 pixel window that are based on and centered on a selected pixel in the color image, wherein for the 5×5 pixel window, the sum of hue values of a left two columns is defined as L55, the sum of hue values of a middle column is defined as V5, and V55=2*V5, and the sum of hue values of a right two columns is defined as R55; and wherein for a 3×5 pixel window, the sum of hue values of a left column is defined as L3, and L35=2*L3, the sum of hue values of a middle column is defined as V3, and V35=2*V3, and the sum of hue values of a right column is defined as R3, and R35=2*R3; and wherein it is discriminated that a vertical boundary exists if any one of the following Equations (13), (14), and (15) is fulfilled:

$$|(L55r - R55r)| \geq T25 \text{ and } |(L35r - R35r)| \geq T26 \quad (13)$$

wherein T25 and T26 are predetermined thresholds for a red channel;

$$|(L55g - R55g)| \geq T27 \text{ and } |(L35g - R35g)| \geq T28 \quad (14)$$

wherein T27 and T28 are predetermined thresholds for a green channel;

$$|(L55b - R55b)| \geq T29 \text{ and } |(L35b - R35b)| \geq T30 \quad (15)$$

wherein T29 and T30 are predetermined thresholds for a blue channel.

7. The method as claimed in claim 6, further comprising detecting whether a black-white boundary exists in the color image if a boundary exists in the color image.

8. The method as claimed in claim 7, wherein two thresholds (T45 and T46) are selected and located in a range of 0~255 for determining the values for two parameters (txcount and bgcount), and wherein for each of twenty-five points in the 5×5 pixel window, the txcount is added by one (1) if all of the hue values of the red, green, and blue channels fall in a range of 0~T45, the txcount is reset to be zero when considering another pixel in the color image based on which another pixel window is created, the bgcount is added by one (1) if all of the hue values of the red, green, and blue channels fall in a range of T46~255, the bgcount is reset to be zero when considering another pixel in the color image based on which another pixel window is created, and wherein a weak sharpness filter is activated if any one of Equations (13), (14) and (15) is fulfilled, and wherein a strong sharpness filter is activated if any one of Equations (13), (14) and (15) is fulfilled and the following Equation (19) is fulfilled:

$$\text{bgcount} \geq T37 \text{ and } \text{txcount} \geq T38 \quad (19)$$

wherein T37 and T38 are predetermined values and wherein $0 \leq \text{txcount} \leq 25$, $0 \leq \text{bgcount} \leq 25$, and $0 \leq (\text{txcount} + \text{bgcount}) \leq 25$.

9. The method as claimed in claim 5, wherein detecting boundary includes creating a 5×5 pixel window and a 5×3 pixel window that are based on and centered on a selected pixel in the color image, wherein for the 5×5 pixel window, the sum of hue values of an upper two rows is defined as U55, the sum of hue values of a middle row is defined as H5, and H55=2*H5, and the sum of hue values of a lower two rows is defined as D55, and wherein for the 5×3 pixel window, the sum of hue values of an upper row is defined as U3, and U53=2*U3, the sum of hue values of a middle row is defined as H3, and H53=2*H3, and the sum of hue values of a lower row is defined as D3, and D53=2*D3; and wherein it is discriminated that a horizontal boundary exists if any one of Equations (16), (17), and (18) is fulfilled:

$$|(U55r - D55r)| \geq T31 \text{ and } |(U53r - D53r)| \geq T32 \quad (16)$$

wherein T31 and T32 are predetermined values for a red channel;

$$|(U55g-D55g)| \geq T33 \text{ and } |(U53g-D53g)| \geq T34 \quad (17)$$

wherein T33 and T34 are predetermined values for a green channel;

$$|(U55b-D55b)| \geq T35 \text{ and } |(U53b-D53b)| \geq T36 \quad (18)$$

wherein T35 and T36 are predetermined values for a blue channel.

10. The method as claimed in claim 9, further comprising detecting whether a black-white boundary exists in the color image if a boundary exists in the color image.

11. The method as claimed in claim 10, wherein two thresholds (T45 and T46) are selected and located in a range of 0~255 for determining the values for two parameters (txcount and bgcount), and wherein for each of twenty-five points in the 5×5 pixel window, the txcount is added by one (1) if all of the hue values of the red, green, and blue channels fall in a range of 0~T45, the txcount is reset to be zero when considering another point, the bgcount is added by one (1) if all of the hue values of the red, green, and blue channels fall in a range of T46~255, the bgcount is reset to be zero when considering another point, and wherein a weak sharpness filter is activated if any one of Equations (16), (17) and (18) is fulfilled, and wherein a strong sharpness filter is activated if any one of Equations (16), (17) and (18) is fulfilled and the following Equation (19) is fulfilled:

$$\text{bgcount} \geq T37 \text{ and } \text{txcount} \geq T38 \quad (19)$$

wherein T37 and T38 are predetermined values and wherein $0 \leq \text{txcount} \leq 25$, $0 \leq \text{bgcount} \leq 25$, and $0 \leq (\text{txcount}+\text{bgcount}) \leq 25$.

12. The method as claimed in claim 5, further comprising detecting whether a black-white boundary exists in the color image if a boundary exists in the color image.

13. The method as claimed in claim 12, further comprising using a weak sharpness filter if no black-white boundary exists in the color image.

14. The method as claimed in claim 12, further comprising using a strong sharpness filter if a black-white boundary exists in the color image.

15. The method as claimed in claim 5, further comprising detecting whether a white background exists in the color image if no boundary exists in the color image.

16. The method as claimed in claim 15, further comprising detecting whether black data exists on the white background.

17. The method as claimed in claim 16, further comprising removing a noise pixel from the white background if black data exists on the white background.

18. The method as claimed in claim 17, wherein the noise pixel is removed from the white background if either one of the following Equations (20) and (21) is fulfilled while all of the hue values of red, green, and blue channels of a center point for a 5×5 pixel window are greater than a first predetermined threshold (T43) or smaller than a second predetermined threshold (T44):

$$\text{bgcount} \geq T39 \text{ and } \text{txcount} < T40 \quad (20)$$

$$\text{bgcount} \geq T41 \text{ and } \text{txcount} < T42 \quad (21)$$

wherein T39, T40, T41, and T42 are predetermined thresholds.

19. A method for processing a color image that is generated as a result of scanning picture, the method comprising detecting whether thin lines exist in the color image; detecting whether a white background exists in the color image; detecting whether black data exist on the white background; and removing pixels from the white background if black data exists on the white background.

20. The method as claimed in claim 19, further comprising detecting whether a boundary exists in the color image if no thin line exists in the color image.

21. The method as claimed in claim 20, further comprising detecting whether a black-white boundary exists in the color image.

22. The method as claimed in claim 21, further comprising using a weak sharpness filter if no black-white boundary exists in the color image.

23. The method as claimed in claim 21, further comprising using a strong sharpness filter if a black-white boundary exists in the color image.

* * * * *